Patented Apr. 3, 1923.

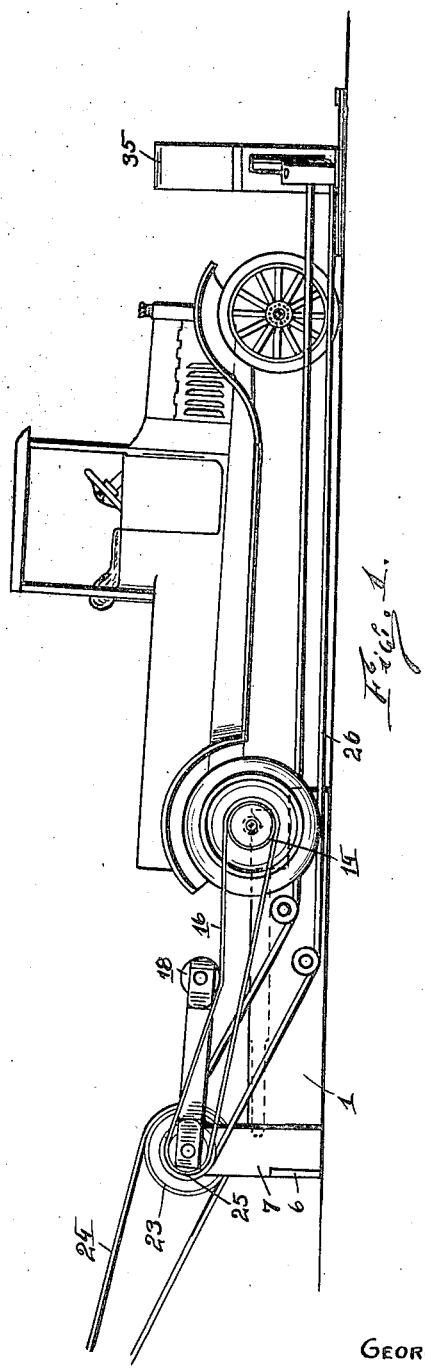

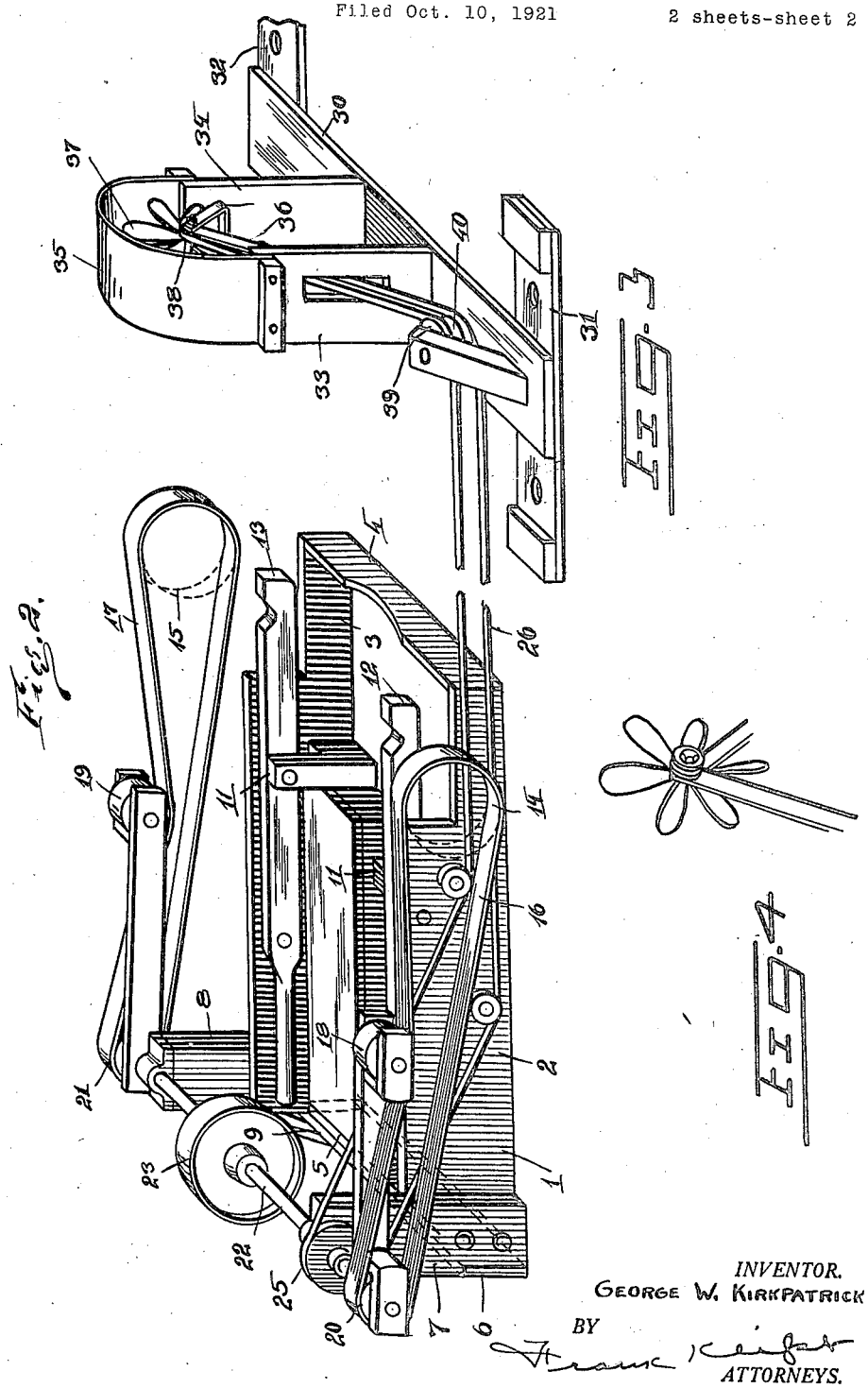

1,450,858

UNITED STATES PATENT OFFICE.

GEORGE W. KIRKPATRICK, OF ROCHESTER, NEW YORK.

COOLING DEVICE FOR POWER-TRANSMISSION JACKS.

Application filed October 10, 1921. Serial No. 506,914.

*To all whom it may concern:*

Be it known that I, GEORGE W. KIRKPATRICK, a citizen of the United States, residing at Rochester, in the county of Monroe and State of New York, have invented certain new and useful Improvements in Cooling Devices for Power-Transmission Jacks, of which the following is a specification.

The object of this invention is to provide a new and improved form of jack for lifting the wheels of an automobile and for transmitting the power therefrom and applying it for some useful purpose while the car is stationary.

These and other objects of the invention will be fully illustrated in the drawings, described in the specification and pointed out in the claims at the end thereof.

This invention is an improvement upon my prior Patent No. 1,279,552 issued September 24, 1918.

In the drawings,

Figure 1 is a side elevation of an automobile in position in my improved jack.

Figure 2 is a perspective view of the jack with the automobile omitted.

Figure 3 is a perspective view of the blower to be used with the jack.

Figure 4 is a perspective view of the fan showing the pulley on the forward side of the bearing and the fan on the rear side of the bearing.

In the several figures of the drawings like reference numerals indicate like parts.

In the drawings, reference numeral 1 indicates the frame having the side members 2 and 3 connected by the cross members 4 and 5. Reference numeral 6 indicates a detachable frame having the uprights 7 and 8 connected by the cross bar 9. This detachable frame is connected to the intermediate frame 1 by bolts which extend thru the uprights 7 and 8 and thru the side members 2 and 3 of the intermediate frame. On the side members 2 and 3 are provided brackets 10 and 11 on which are pivotally mounted the levers 12 and 13 which are recessed at their forward end to engage under the rear axle of the car and lift the axle so as to raise the rear wheels from the ground. On the rear wheels are fastened in any suitable way the pulleys 14 and 15 which drive the belts 16 and 17 which are kept in proper tension by the idler pulleys 18 and 19. The belts 16 and 17 engage with pulleys 20 and 21 and drive the shaft 22, and pulley 23 which in turn drives the belt 24 for any suitable power purpose.

On the shaft 22 is provided a pulley 25 which drives an endless cable or belt 26 which cable runs forward past the automobile for the purpose of driving a fan which delivers a blast of air to the radiator corresponding to the air blast that would strike the radiator if the car were in motion, and in this way the radiator is kept cool. For the purpose of supporting this fan I have provided a forward frame having a cross bar 30, having plates 31 and 32 provided on the ends thereof which rest on the ground for the purpose of supporting a cross bar above the ground. On the cross bar 30 is an upright frame comprising the side members 33 and 34 and the top hood or tunnel 35. The frame supports a bracket 36 which in turn supports a bearing for the shaft of the fan 37 in which the fan revolves. The fan is provided with a pulley 38 between it and the bearing over which the endless cable 26 passes.

Idle pulleys 39 and 40 are provided for changing the course of the cable so that it will properly transmit the power from the shaft 22 forward to the fan. The cable runs under the bracket 36 and is put on the pulley by passing it over the fan then dropping it into position on the pulley and then moving the standard out to draw the cable tight.

After the automobile has been suitably placed in the jack the fan attachment is placed in front of the radiator so that the fan will blow air thereon and the frame is adjusted to take up the slack in the cable after which the power mechanism of the automobile can be started and can be applied for any useful purpose desired.

In Figure 4 I have shown a modification of the mounting for the fan in which the bearing is placed between the pulley and the fan. I have found that at high speed there is a tendency for the suction of the fan to draw the cable into the fan where the pulley is placed between the bearing and the fan. But placing the pulley in front of the bearing the cable runs further from the fan and this objection is avoided.

I claim:

1. In a cooling device for power transmission jacks, the combination of an air tunnel, an inverted V shaped bracket suspended within said air tunnel, a bearing formed on said V shaped bracket, a spindle mounted to rotate in said bearing, a pulley and fan mounted on said spindle, a base for supporting said tunnel, an inclined bracket mounted on said base on one side of said tunnel, a pulley mounted to rotate on said inclined bracket between it and said base, said tunnel having an opening in the side thereof adjacent to said pulley mounted on said inclined bracket, a belt passing through the opening in said tunnel from said pulley on the outside of said tunnel to said pulley on the inside of said tunnel.

2. In a cooling device for power transmission jacks, the combination of an air tunnel, a bracket suspended within said tunnel, a spindle carried by said bracket, a pulley and fan mounted on said spindle, a base for supporting said tunnel, a bracket provided on said base, on one side of said tunnel, a pulley mounted to rotate on said bracket, said tunnel having an opening in the side thereof opposite to the pulley on said bracket, a belt passing through the opening in said tunnel from said pulley on the outside of said tunnel to said pulley and fan on the inside of said tunnel.

In testimony whereof I affix my signature.

GEORGE W. KIRKPATRICK.